United States Patent [19]
Mori et al.

[11] Patent Number: 5,105,436
[45] Date of Patent: Apr. 14, 1992

[54] SPREAD SPECTRUM RECEIVER

[75] Inventors: Masaharu Mori; Masahiro Hamatsu; Shoichi Minagawa, all of Tokyo, Japan

[73] Assignee: Clarion Co., Ltd., Tokyo, Japan

[21] Appl. No.: 554,537

[22] Filed: Jul. 18, 1990

[30] Foreign Application Priority Data

Jul. 20, 1989 [JP] Japan .................... 1-186055
Sep. 22, 1989 [JP] Japan .................... 1-244931

[51] Int. Cl.$^5$ .......................................... H04L 27/30
[52] U.S. Cl. ........................................ 375/1; 380/34; 375/81; 375/120
[58] Field of Search ............... 375/81, 90, 96, 114, 375/119, 120

[56] References Cited

U.S. PATENT DOCUMENTS

| | | | |
|---|---|---|---|
| 4,112,372 | 9/1978 | Holmes et al. | 375/1 |
| 4,327,438 | 4/1982 | Baier et al. | 375/1 |
| 4,601,047 | 7/1986 | Horwitz et al. | 375/1 X |
| 4,943,975 | 7/1990 | Kurihara et al. | 375/1 |

Primary Examiner—Bernarr E. Gregory
Attorney, Agent, or Firm—Flynn, Thiel, Boutell & Tanis

[57] ABSTRACT

A spread spectrum receiver using a correlator includes a pattern matching circuit for deciding presence or absence of a pulse output which is obtained upon coincidence between the pattern of a correlator output and a predetermined pattern, so as to switch a PN code inside the receiver or the center frequency of a received signal when absence of the pulse output is acknowledged.

12 Claims, 8 Drawing Sheets

FIG. II

SPREAD SPECTRUM RECEIVER

FIELD OF THE INVENTION

This invention relates to a spread spectrum receiver and, more particularly, to an improvement enabling normal reception even under a bad S/N ratio.

BACKGROUND OF THE INVENTION

A spread spectrum communication (SSC) system has such advantages, among others, that it is resistive against interference and fading and that it has a secrecy. However, the system still involves a lot of technical problems one of which is how to reliably synchronize a PN code contained in a received signal with a reference code prepared in a receiver. A system using a convolver as a correlator is effective for overcoming the problem. An example thereof is shown in FIGS. 9 through 11.

Figure 9:
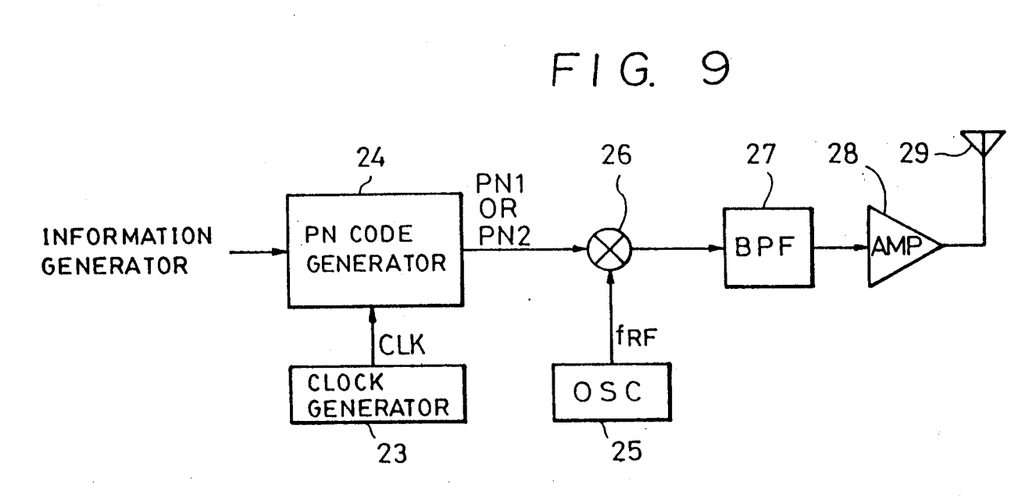
FIG. 9 is a block diagram showing an arrangement on the part of a transmitter of a conventional spread spectrum system.

FIG. 9 shows an arrangement on the part of a transmitter. Reference numeral 23 refers to a clock generator, 24 to a PN code generator, 25 to a carrier oscillator, 26 to a mixer, 27 to a band pass filter, 28 to an amplifier, and 29 to a transmission antenna.

Figure 11:
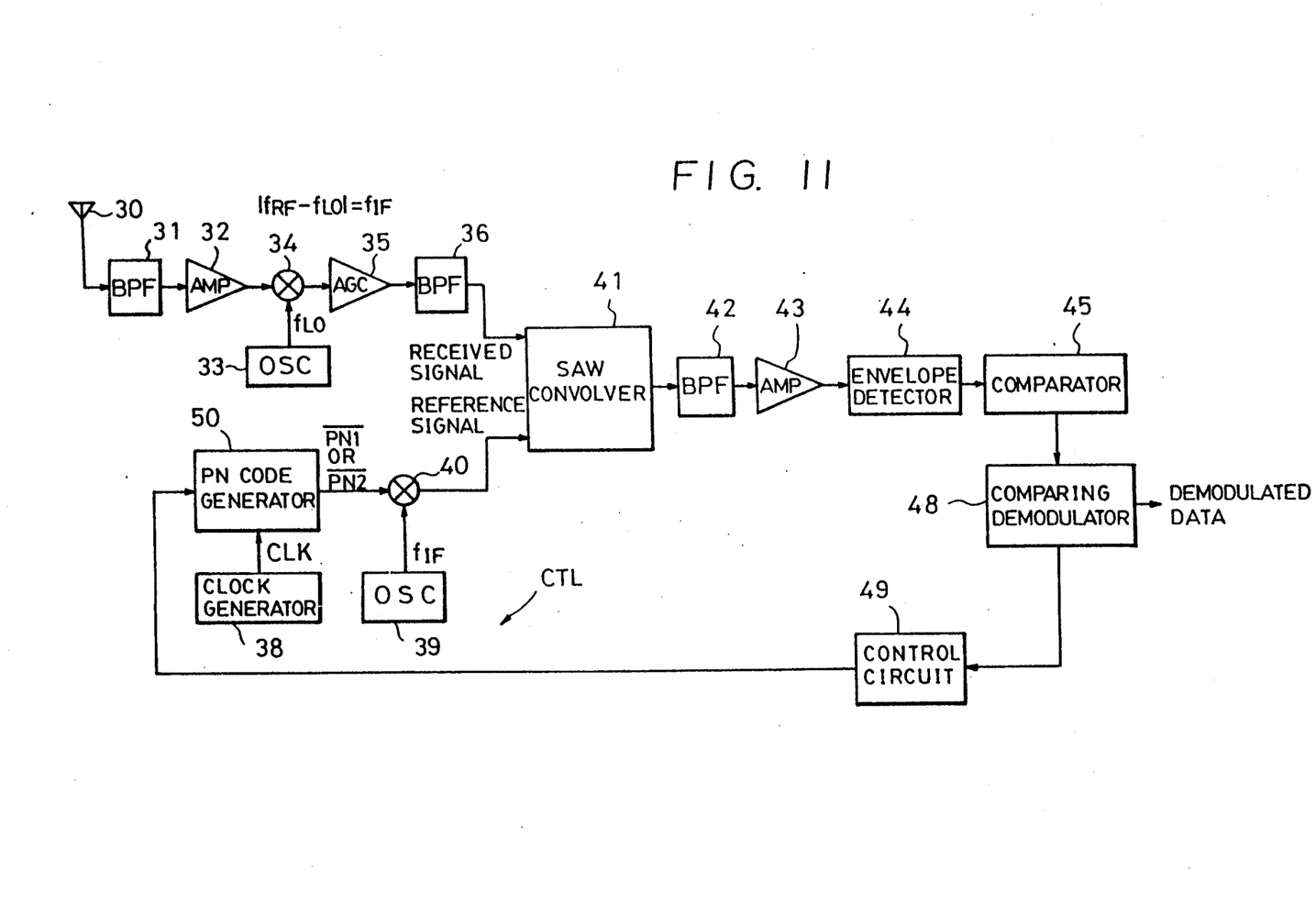
FIG. 11 is a block diagram showing an arrangement on the part of a receiver of the conventional spread spectrum system.

FIG. 11 shows an arrangement on the part of a receiver. Reference numeral 30 refers to a reception antenna, 31 to a band pass filter, 32 to an amplifier, 33 to a local oscillator, 34 to a mixer, 35 to an AGC circuit, 36 to a band pass filter, 38 to a clock generator, 39 to an oscillator, 40 to a mixer, 41 to a surface acoustic wave (SAW) convolver, 42 to a band pass filter, 43 to an amplifier, 44 to an envelope detector, 45 to a comparator, 48 to a comparing demodulator, 49 to a control circuit, and 50 to a PN code generator.

Figure 10:
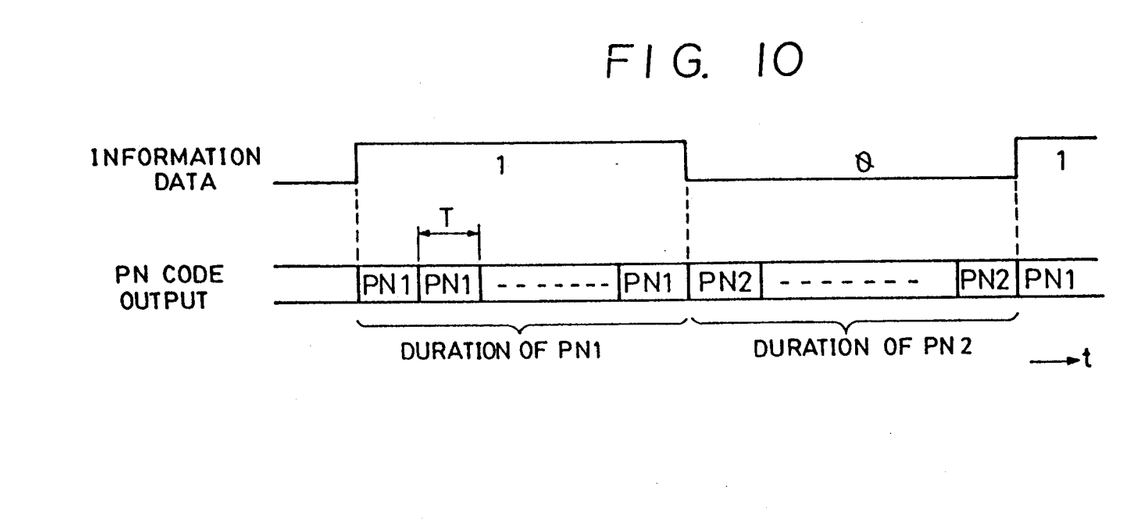
FIG. 10 is a diagram for explanation of the operation of the same transmitter.

As shown in FIG. 10, the receiver switches the PN code between PN1 and PN2 having different code patterns in response to information data, and performs CSK (Code Shift Keying) modulation.

The receiver, which demodulates the transmitted data by applying a received signal and a reference signal to the SAW convolvers 41, improves the process gain by tracking the PN code contained in the received signal through a code tracking loop CTL.

The conventional system, however, is readily affected by a noise under a poor S/N ratio of the received signal, which results in an unstable tracking operation of the code tracking loop which, in turn, causes an increase of the bit error in the received data.

OBJECT OF THE INVENTION

It is therefore an object of the invention to provide a spread spectrum receiver having an improved code tracking loop to improve the process gain of the receiver and capable of normal reception even under a smaller S/N ratio.

SUMMARY OF THE INVENTION

In order to attain the object, a spread spectrum receiver according to the invention comprises: a correlator for correlating a received signal with a PN code inside said receiver; pattern matching means for deciding whether the pattern of a correlator output coincides with a predetermined pattern or not and for obtaining a pulse output responsive to the pattern of the correlator output upon such coincidence; deciding means for deciding the presence or the absence of the pulse output; and switching means for switching the PN code inside the receiver or the center frequency of the received signal when the deciding means has decided that no pulse output is present.

In lieu of the switching means, the receiver may use a timer circuit responsive to an output of the deciding means for counting the time in which no correlator output is obtained, and use a different type of switching means responsive to the counting of the circuit for switching the PN code or the center frequency of the received signal.

Under this arrangement, even under a bad S/N ratio of the correlator output caused by a bad S/N ratio of the received signal, the PN code in the receiver or the center frequency of the received signal is switched over, and demodulated data are obtained. Therefore, code tracking is reliably performed, and the process gain of the receiver is improved.

DESCRIPTION OF THE PREFERRED EMBODIMENT

The invention is described below, referring to preferred embodiments illustrated in the drawings.

Figure 1A:
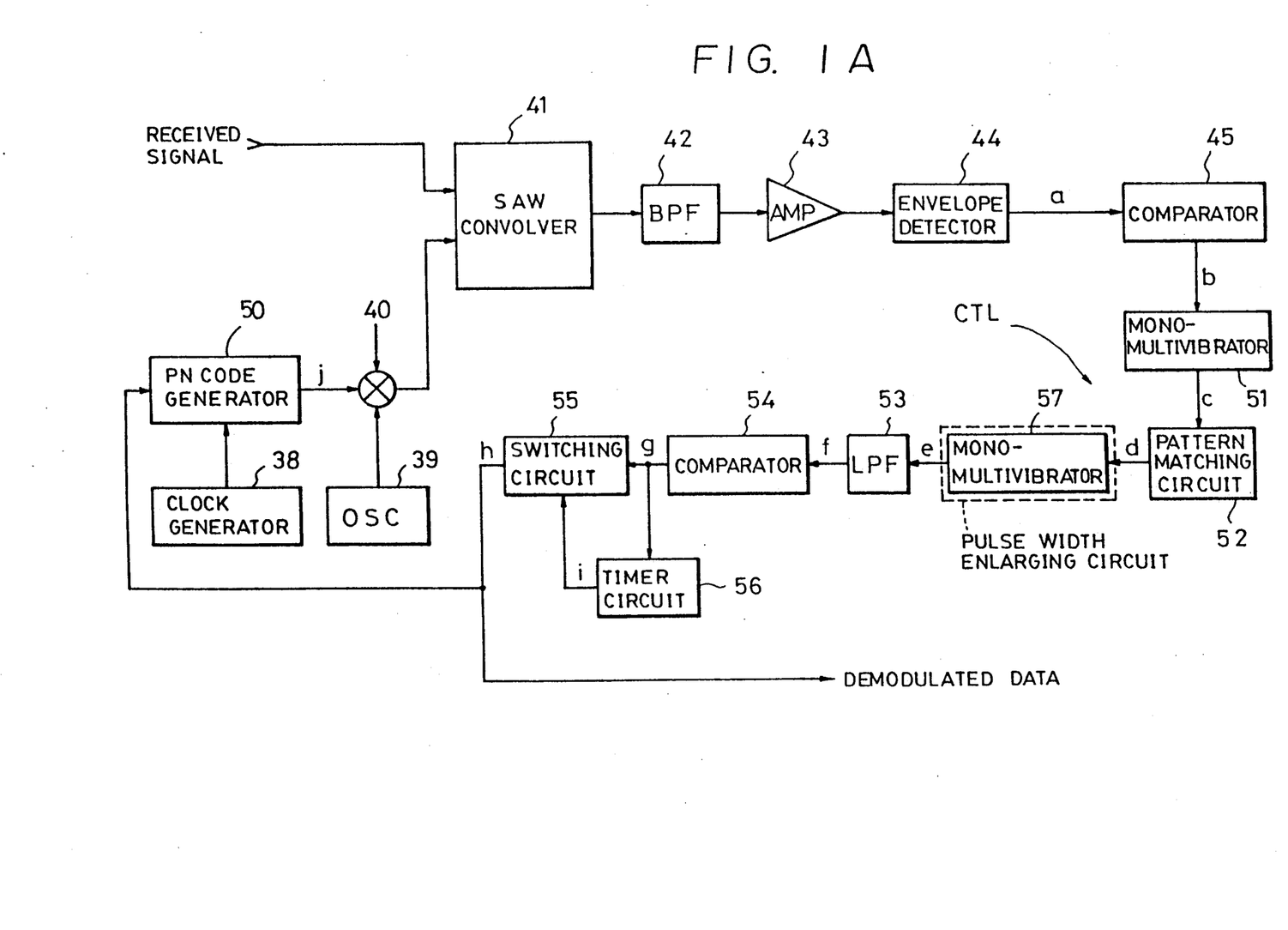
FIGS. 1A and 1B are block diagrams showing an embodiment of the invention.
Figure 1B:
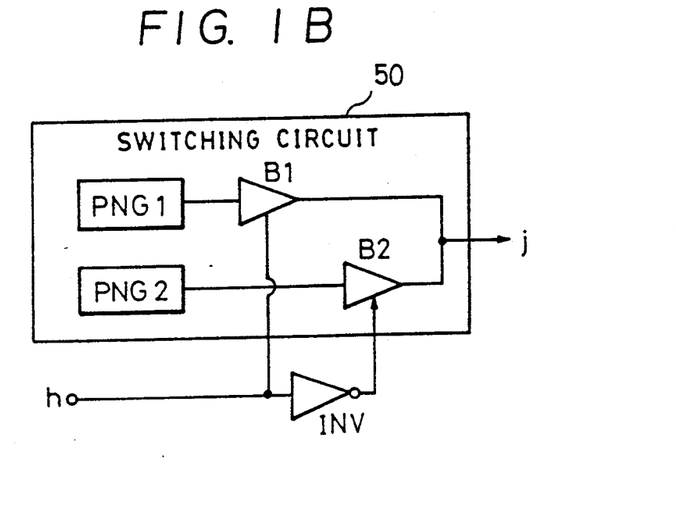

FIG. 1A and 1B show a spread spectrum receiver embodying the invention.

The same numerals as those of FIG. 11 indicate identical or equivalent circuits. Numeral 51 refers to a mono-multivibrator, 52 to a pattern matching circuit, 53 to a low pass filter, 54 to a comparator, 55 to a switching circuit, 56 to a timer circuit, and 57 to a pulse width expanding circuit which may be a mono-multivibrator. The mono-multivibrator 51, the switching circuit 55 and the timer circuit 56 form a code tracking loop CTL.

Figure 2:
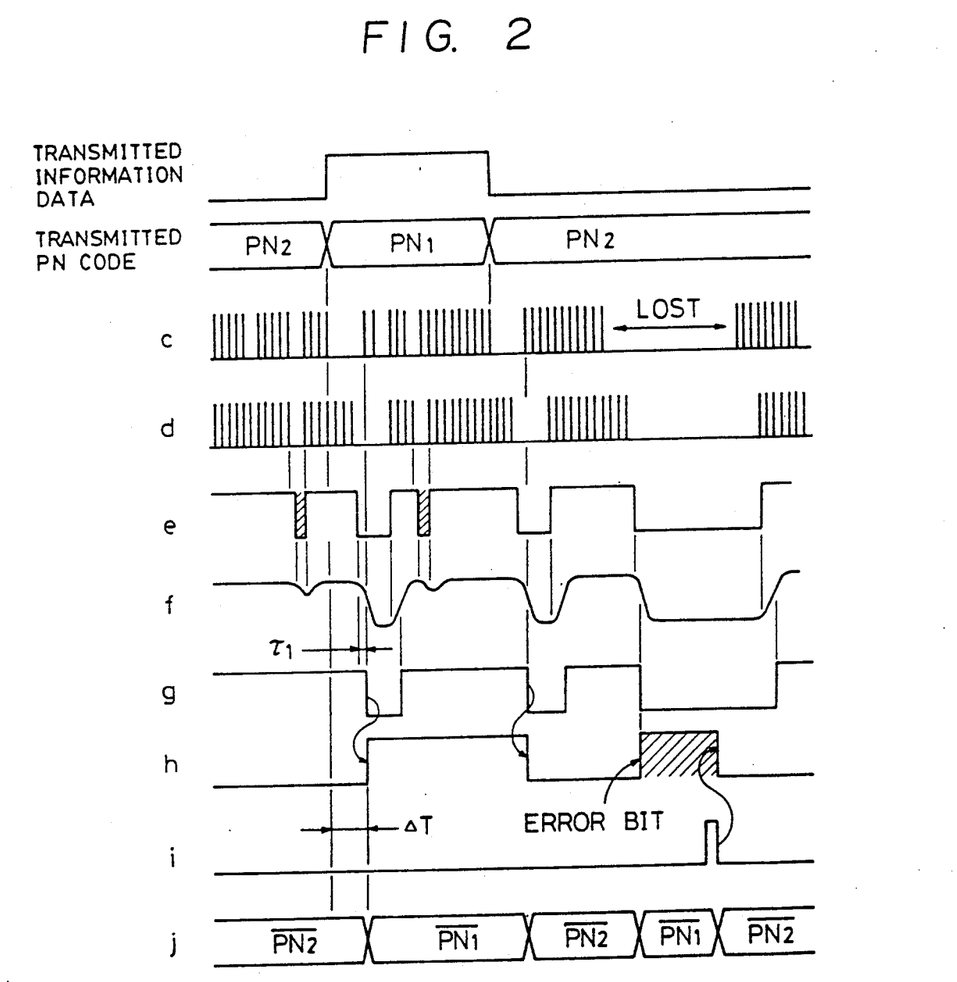
FIG. 2 is a timing chart for explanation of the operation of the same embodiment.

In this embodiment, the mono-multivibrator 51 receives as its input an output pulse b of the comparator 45, and expands its pulse width to obtain a pulse c having a width not smaller than the clock cycle of the pattern matching circuit 52. The pattern matching circuit 52 utilizes such a nature that a target signal of the output of the SAW convolver 41 is periodical, and extracts a periodical signal component alone from the pulse c. That is, even when the pulse c lacks the target component or it includes a component mixed therein other than the target component, is so far as the lack and the mixture do not exceed certain degrees, the pulse output d in a proper form is obtained. The pulse width expanding circuit 57 receives as its input the pulse d and, when the pulse d is periodically continuous, it obtains a pulse e which continuously represents an "H" level. When the receiving condition is so bad that a normal pulse cannot be obtained by the operation of the pattern matching circuit 52, an unwanted component (hatched portion) appears in the pulse e as shown in FIG. 2. The low pass filter 53 obtains an output f, and the comparator 54 compares it with an appropriate threshold voltage to obtain a pulse g. The pulse g is not affected by the hatched portion of the pulse e. The switching circuit 55 receives as its input the pulse g and produces a pulse h. The pulse h is toggled and supplied at a falling edge of the pulse g. When the duration of the L level of the pulse g surpasses a predetermined period of time, the timer circuit 56 deems it as disappearance of the output of the SAW convolver 41, and produces a pulse i to forcibly toggle the pulse h in order to limit the bit error to a minimum value.

The pulse h not only behaves as a signal for switching the code from the PN code generator 50 but it also serves as demodulated data.

The PN code generator 50 may comprise, as shown in FIG. 1B, two PN code generating circuits PNG1 and PNG2 and two switching circuits B1 and B2. The switching circuits B1 and B2 are turned on and off in response to the pulse h, and one of PN codes from the PN code generating circuits PNG1 and PNG2 is switchingly selected as an output j. In this embodiment, a delay time $\Delta T$ is present in the operation of the code tracking loop CTL. However, in so far as the inverse number of the data rate is at least the double of the delay time $\Delta T$, the CTL is operative. The $\Delta T$ merely invites a delay of the transmitted information data and the demodulated data, and this is not a serious problem.

Figure 3:
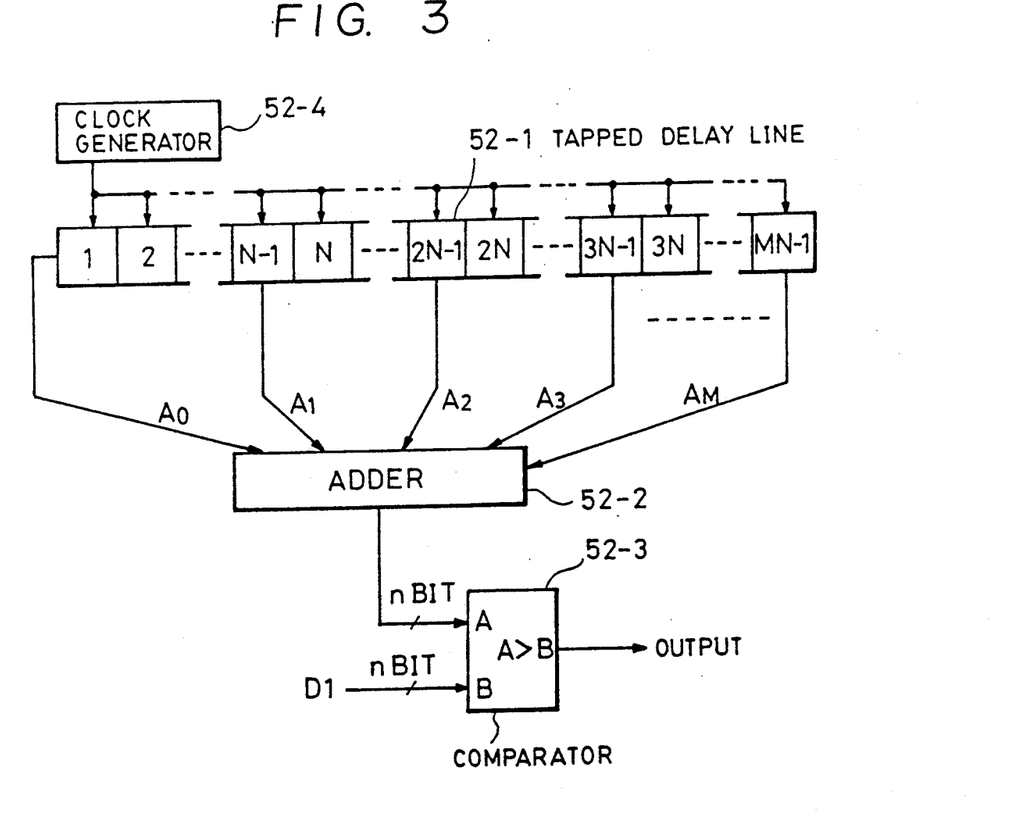
FIG. 3 is a block diagram showing an arrangement of a pattern matching circuit.

An arrangement of the pattern matching circuit 52 is shown in FIG. 3.

Reference numeral 52-1 refers to a tapped delay line as a shift register for a binary signal, 52-2 to a high level adder, and 52-3 to a magnitude comparator. The time interval of taps of the delay line 52-1 is so selected to coincide with the cycle of the target signal of the SAW convolver 41 or to be any integer times thereof. Tap outputs are applied to the adder 52-2 which counts how many tap outputs represent the H level. The number of the H-level tap outputs is formed into data of n bits which is fed to the comparator 52-3 for comparison with data D1 prepared on the part of the receiver. When the number of H-level tap outputs is D1 or more, the output of the comparator 52-3 represents the H level but otherwise represents the L level.

Figure 4:
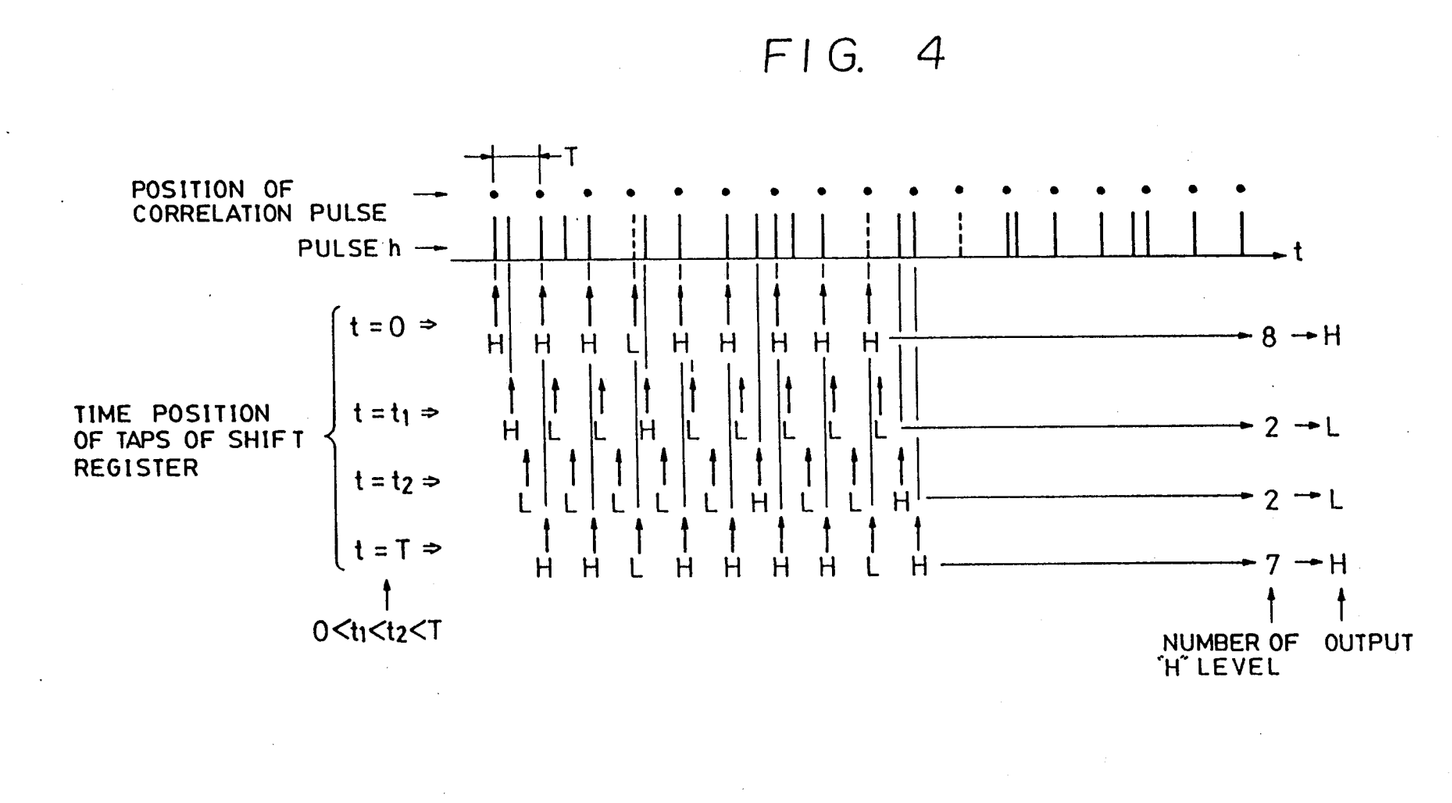
FIG. 4 is a diagram for explanation of the operation of the same pattern matching circuit.

FIG. 4 shows that the delay line 52-1 includes nine taps (M=8) at intervals equal to the cycle T of the target pulse of the convolver.

Referring to FIG. 4, under a good S/N ratio, the input pulse c always appears at point-marked positions and never at other positions. FIG. 4, however, shows a condition under a bad S/N ratio, and the pulse fails to appear at the point-marked positions and rather appears at other positions. Upward-oriented arrow marks indicate tap positions of the shift register 52-1, and H and L thereunder indicate tap outputs. An expected operation of the circuit of FIG. 3 is an operation in which its output represents the H level under t=0 and t=T and otherwise represents the L level, and FIG. 4 shows that such operation is realized. The low pass filter 53 may be either passive, active or digital. When the data rate is variable, it is necessary to switch the cut-off frequency into an optimum value responsively. In this respect, a readily variable filter such as switched capacitor filter is preferable.

Figure 5:
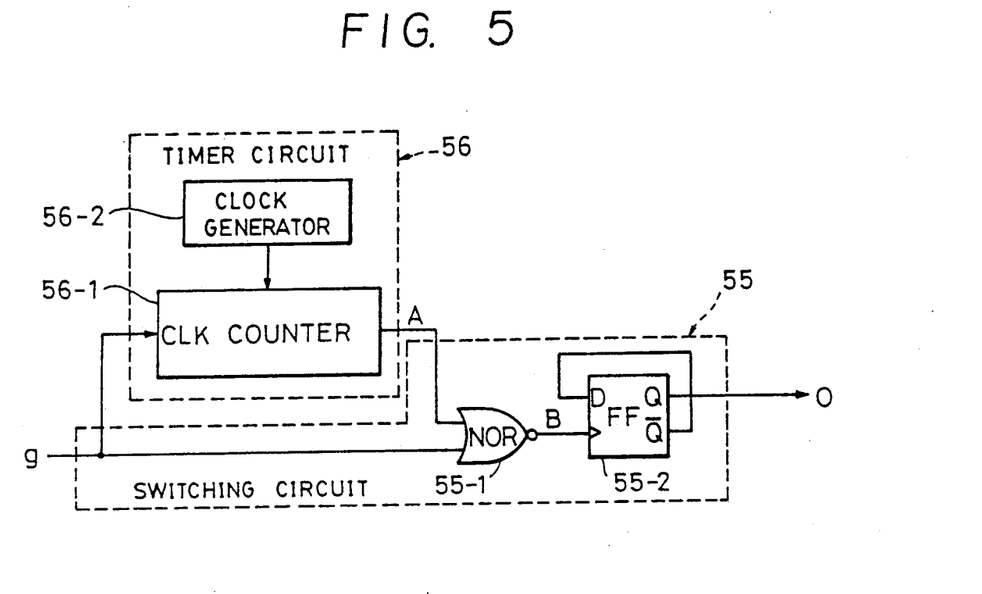
FIG. 5 is a block diagram showing an arrangement of a switching circuit and a timer circuit.
Figure 6:
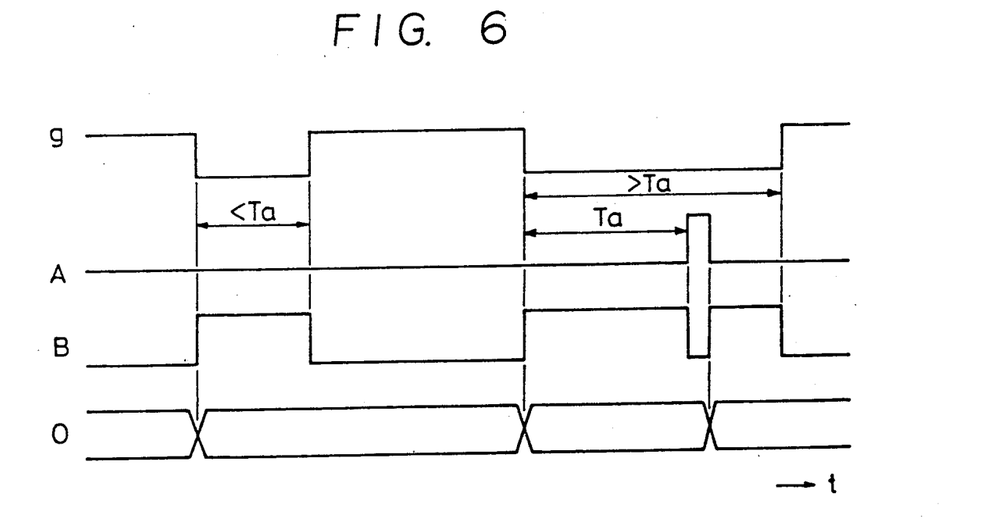
FIG. 6 is a timing chart for explanation of the operations of the same switching circuit and timer circuit.

FIG. 5 shows an arrangement of the switching circuit 55 and the timer circuit 56. The switching circuit 55 includes a NOR circuit 55-1 and a flipflop 55-2. The timer circuit 56 includes a clock generator 56-2 and a counter 56-1. The counter 56-1 does not effect its counting and maintain the zero count value when a clear (CLR) input is the H level. However, when the CLR input represents the L level, the counter 56-1 starts counting clocks from the clock generator 56-2 and, when the counting reaches a predetermined value, it produces a pulse A of the H level as shown in FIG. 6. Assuming that the time required for reaching the predetermined count value is Ta, the pulse A does not appear in so far as the duration of the L level of the pulse g is less than Ta (Ta is selected to be larger than $\Delta T$ of FIG. 2). When the duration of the L level of the pulse g is longer than Ta, the pulse A represents the H level and toggles the pulse h. This operation is effective in the event discussed below.

As shown in FIG. 2, when lack of the correlation output occurs under a non-variable condition of the transmitted information data, the pulse h is undesirably toggled. Therefore, unless this is cured, the demodulated data represents an error for a long time. However, by generating the pulse i of FIG. 2 and re-toggling it by the operation of FIG. 6 when the lack lasts for a predetermined time, the duration of the error bit of the pulse h shown by hatched lines is limited to a minimum value.

Figure 7:
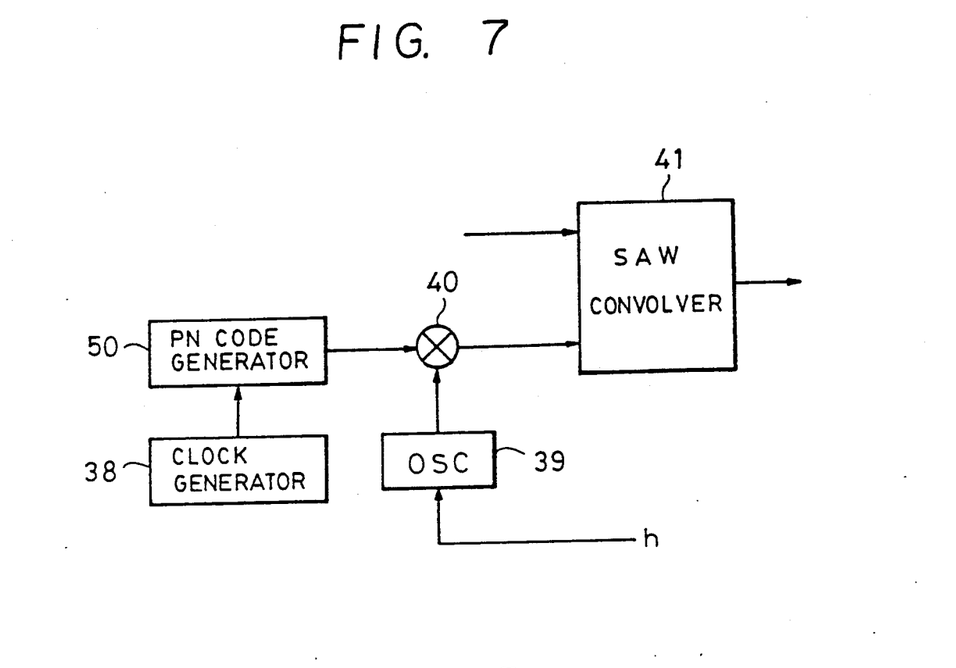
FIGS. 7 and 8 are fragmentary block diagrams of modified arrangements of the invention.
Figure 8:
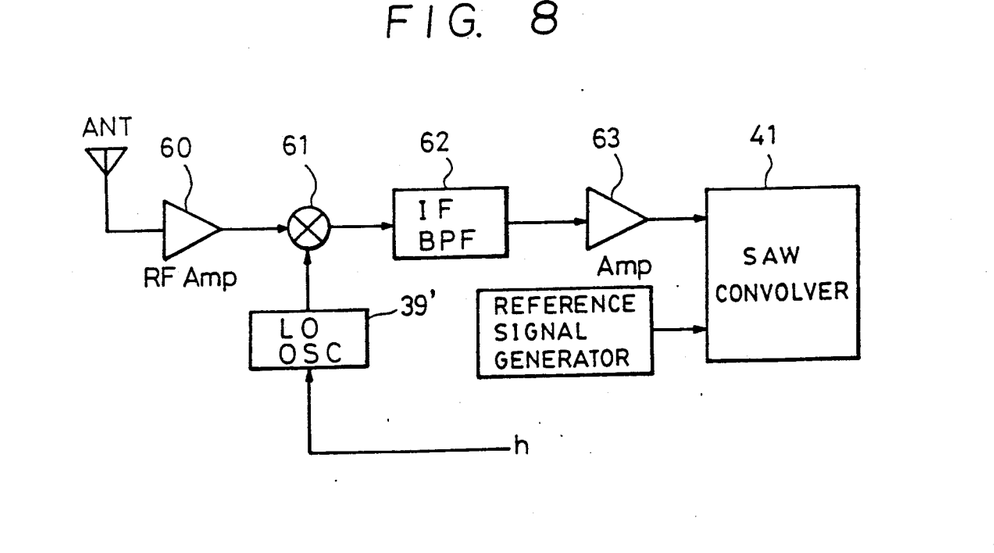

Such lack of the correlator output, although not shown in FIG. 1, is an undesired phenomenum caused by incomplete control of a threshold voltage applied to the comparator 45. This, however, can be compensated by the operation of FIG. 6. In a system configured to change over the transmitted center frequency by information data on the part of the transmitter, it is advisable to control, a local oscillator 39 or 39' as shown in FIG. 7 or 8, by the output pulse h of the switching circuit 55 to switch the center frequency of the received signal. In FIG. 8, reference numeral 60 refers to an RF amplifier, 61 to a mixer, 62 to an IF band pass filter, and 63 to an IF amplifier.

As described above, the spread spectrum receiver according to the invention never fails to obtain proper demodulated data even under a poor receiving condition having a low S/N.

What is claimed is:
1. A tracking loop for a spread spectrum receiver comprising:
 a PN code generator for producing a first PN code and a second PN code;
 a correlator for correlating a received signal with said first or second PN code and for generating a correlator output;
 pattern matching means for deciding whether the pattern of said correlator output coincides with a predetermined pattern or not, and for producing a pulse output corresponding to a coinciding pattern of said correlator output;
 deciding means for deciding presence or absence of said pulse output; and
 switching means responsive to said deciding means for causing said PN code generator to respectively output said first PN code and said second PN code when said deciding means is indicating that said pulse output is respectively present and absent.

2. The tracking loop according to claim 1 wherein said pattern matching means includes tapped delay means, adder means for adding tap outputs from respective taps of said delay means; and comparator means for comparing adder outputs from said adder means.

3. The tracking loop according to claim 1 wherein said deciding means includes a pulse width extending circuit for extending the pulse width of said pulse output from said pattern matching means, and includes a low pass filter which is supplied with an output of said pulse width extending circuit.

4. A tracking loop for a spread spectrum receiver comprising:
- a PN code generator for producing a PN code;
- a correlator for correlating a received signal with said PN code and for generating a correlator output;
- reception frequency converting means interposed between an antenna and said correlator;
- pattern matching means for deciding whether the pattern of said correlator output coincides with a predetermined pattern or not, and for producing a pulse output corresponding to a coinciding pattern of said correlator output;
- deciding means for deciding presence or absence of said pulse output; and
- switching means responsive to said deciding means for switching a reception center frequency in said converting means to respective first and second frequency values when said deciding means is indicating that said pulse output is respectively present and absent.

5. The tracking loop according to claim 4, wherein said pattern matching means includes taped delay means, adder means for adding tap outputs from respective taps of said delay means; and comparator means for comparing adder outputs from said adder means.

6. The tracking loop according to claim 4, wherein said deciding means includes a pulse width extending circuit for extending the pulse width of said pulse output from said pattern matching means, and includes a low pass filter which is supplied with an output of said pulse width extending circuit.

7. A tracking loop for a spread spectrum receiver comprising:
- a PN code generator for generating a PN code;
- a correlator for correlating a received signal with said PN code and for producing a correlator output;
- frequency converter means interposed between said PN code generator and said correlator to convert the frequency of said PN code;
- pattern matching means for deciding whether the pattern of said correlator output coincides with a predetermined pattern or not, and for producing a pulse output corresponding to a coinciding pattern of said correlator output;
- deciding means for deciding presence or absence of said pulse output; and
- switching means responsive to said deciding means for switching the frequency of said PN code in said converter means to respective first and second frequency values when said deciding means is indicating that said pulse output is respectively present and absent.

8. The tracking loop according to claim 7, wherein said pattern matching means includes tapped delay means, adder means for adding tap outputs from respective taps of said delay means; and comparator means for comparing adder outputs from said adder means.

9. The tracking loop according to claim 7, wherein said deciding means includes a pulse width extending circuit for extending the pulse width of said pulse output from said pattern matching means, and includes a low pass filter which is supplied with an output of said pulse width extending circuit.

10. A tracking loop for a spread spectrum receiver comprising:
- a PN code generator for producing a first PN code and a second PN code;
- a correlator for correlating a received signal with said first or second PN code and for generating a correlator output;
- deciding means for deciding presence or absence of said correlator output;
- a timer circuit responsive to an output of said deciding means to count the time in which no said correlator output is present; and
- switching means responsive to the counting of said timer circuit for causing said PN code generator to respectively output said first PN code and said second PN code when a time period time since the most recent occurrence of said correlator output is respectively greater than and less than a predetermined time interval.

11. A tracking loop for a spread spectrum receiver comprising:
- a PN code generator for producing a PN code;
- a correlator for correlating a received signal with said PN code and for generating a correlator output;
- frequency converting means interposed between said PN code generator and said correlator to convert the frequency of said PN code;
- deciding means for deciding presence or absence of said correlator output;
- a timer circuit responsive to an output of said deciding means to count the time in which no said correlator output is present; and
- switching means responsive to the counting of said timer circuit to switch the frequency of said PN code in said converting means to respective first and second frequency values when said timer circuit indicates that a time period since the most recent occurrence of said correlator output is respectively greater than and less than a predetermined time interval.

12. A tracking loop for a spread spectrum receiver comprising:
- a PN code generator for producing a PN code;
- a correlator for correlating a received signal with said PN code and for generating a correlator output;
- reception frequency converting means interposed between an antenna and said correlator;
- deciding means for deciding presence or absence of said correlator output;
- a timer circuit responsive to an output of said deciding means to count the time in which no said correlator output is present; and
- switching means responsive to the counting of said timer circuit to switch the reception center frequency in said converting means to respective first and second frequency values when said timer circuit indicates that a time period since the most recent occurrence of said correlator output is respectively greater than and less than a predetermined time interval.

* * * * *